United States Patent
Chow et al.

(10) Patent No.: US 6,170,263 B1
(45) Date of Patent: Jan. 9, 2001

(54) METHOD AND APPARATUS FOR CONVERTING LOW GRADE HEAT TO COOLING LOAD IN AN INTEGRATED GASIFICATION SYSTEM

(75) Inventors: Cedric Chow, Schenectady; Ashok Kumar Anand; Jatila Ranasinghe, both of Niskayuna; David Andrew Stats, Clifton Park, all of NY (US)

(73) Assignee: General Electric Co., Schenectady, NY (US)

( * ) Notice: Under 35 U.S.C. 154(b), the term of this patent shall be extended for 0 days.

(21) Appl. No.: 09/311,098

(22) Filed: May 13, 1999

(51) Int. Cl.[7] ................................................ F01K 25/06
(52) U.S. Cl. ............................ 60/649; 60/655; 60/673
(58) Field of Search .............................. 60/649, 655, 673

(56) References Cited

U.S. PATENT DOCUMENTS

| | | | |
|---|---|---|---|
| 4,982,568 | * 1/1991 | Kalina | ................................... 60/649 |
| 5,029,444 | 7/1991 | Kalina . | |
| 5,095,708 | 3/1992 | Kalina . | |
| 5,572,871 | * 11/1996 | Kalina | ................................... 60/649 |
| 5,649,426 | 7/1997 | Kalina . | |
| 5,822,990 | 10/1998 | Kalina . | |

* cited by examiner

Primary Examiner—Hoang Nguyen
(74) Attorney, Agent, or Firm—Nixon & Vanderhye

(57) ABSTRACT

Low grade heat recovered from various sections of an integrated gasification system is used to drive an absorption chilling cycle. In an exemplary embodiment, the recovered low grade heat is used to heat a two component working solution that is pumped through a closed cycle absorption chilling system. The heated working solution is separated into a rich stream and a lean stream. The rich stream is condensed to produce a liquid rich stream that is throttled to reduce its temperature and then evaporated to produce a cooling load. The cooling load may be used for auxiliary cooling needs in the integrated gasification system. The rich vapor stream produced by the evaporating step is mixed with the lean stream to produce a mixed stream, which is cooled in an absorber to produce the working solution for the cycle to be repeated.

16 Claims, 3 Drawing Sheets

METHOD AND APPARATUS FOR CONVERTING LOW GRADE HEAT TO COOLING LOAD IN AN INTEGRATED GASIFICATION SYSTEM

TECHNICAL FIELD

The present invention relates generally to the field of thermal energy conversion and, more particularly, to the conversion of low grade heat to a cooling load which may be used for auxiliary cooling needs in an integrated gasification system.

BACKGROUND OF THE INVENTION

Gas produced by the gasification process for integrated gasification power plants and industrial process applications needs to be cooled for effective gas treatment. Typically, the thermal energy of the raw gas is used in the combined cycle unit to improve the performance of the power cycle. Additional low grade heat, typically below about 150° C. (about 300° F.), is also normally available in the raw gas. However, this low grade heat is too low in temperature for steam generation for the bottoming cycle. Additional sources of low grade heat exist and are available in other sections of the integrated gasification unit, such as the air separation unit, the sulfur removal/recovery unit, heat recovery steam generator, and other subsystems. This low grade heat energy is normally rejected to the cooling water, or sometimes used for liquid heating duties, which have minor performance benefits.

BRIEF SUMMARY OF THE INVENTION

There has thus developed a need for a system and process which can use the previously un-utilized or underutilized low grade heat in the raw gas, preferably to enhance the thermodynamic efficiency of the integrated gasification system.

The invention provides a system and process whereby low grade heat recovered, for example by heat exchange, from various sections of, e.g., an integrated gasification system, is used to drive an absorption chilling cycle. The cooling load produced by this absorption chilling system may then be used for auxiliary cooling needs in the integrated gasification system. The use of previously un-utilized or underutilized low grade heat in the raw gas reduces auxiliary power requirements of cooling loads in the cycle, and thus enhances the thermodynamic efficiency of the integrated gasification system.

In accordance with a preferred embodiment of the present invention, there is provided a method of producing a cooling load, e.g., from low grade heat recovered from a gasification process, that comprises heating a working solution that is being pumping along a flow path, forming a rich stream and a lean stream from the heated working solution, condensing the rich stream to produce a liquid rich stream, throttling the rich stream to reduce the temperature thereof, evaporating the rich stream to produce a cooling load, mixing the rich vapor stream produced by the evaporating step with the lean stream to produce a mixed stream, and cooling the mixed stream in an absorber thereby to produce the working solution for the cycle to repeat. In a presently preferred system, the working solution is partly evaporated before the heating step with heat transferred from the lean stream.

Also in accordance with a preferred embodiment of the present invention an apparatus is provided for producing a cooling load, e.g., from low grade heat recovered from a gasification process, that comprises a first flow path; a pump for pumping a liquid working solution along the first flow path; means for heating the working solution flowing along the first flow path with heat from a source remote from the first flow path; a separator for forming a rich stream and a lean stream from heated working solution flowing thereinto from the first flow path; a second flow path for the rich stream exiting the separator; a third flow path for the lean stream exiting the separator; a condenser along the second flow path for condensing the rich stream to produce a liquid rich stream; a throttle valve along the second flow path for reducing a temperature of the liquid rich stream; and an evaporator along the second flow path for evaporating the rich stream to produce a cooling load. The second flow path and the third flow path are then joined to define the first flow path, downstream from the evaporator, for mixing the rich vapor stream produced by the evaporator with the lean stream flowing along the third flow path, to produce a mixed stream which is cooled by an absorber thereby to produce the working solution to be pumped by the pump. Also, the working solution is preferably pre-heated by the lean stream before being heated by the remote heat source.

The invention may thus be embodied in an integrated gasification system that includes a gasification and reforming system for receiving a fuel and converting the same to a hot raw gas, a gas cooling section for cooling the hot raw gas produced by the gas reforming section and an absorption chilling system for recovering low grade heat from at least the gas cooling system and producing a cooling load for auxiliary cooling, the absorption chilling system including that comprises a first flow path; a pump for pumping a liquid working solution along the first flow path; means for heating the working solution flowing along the first flow path with heat from a source remote from the first flow path; a separator for forming a rich stream and a lean stream from heated working solution flowing thereinto from the first flow path; a second flow path for the rich stream exiting the separator; a third flow path for the lean stream exiting the separator; a condenser along the second flow path for condensing the rich stream to produce a liquid rich stream; a throttle valve along the second flow path for reducing a temperature of the liquid rich stream; an evaporator along the second flow path for evaporating the rich stream to produce a cooling load; the second flow path and the third flow path being joined to define the first flow path, downstream from the evaporator, for mixing the rich vapor stream produced by the evaporator with the lean stream flowing along the third flow path, to produce a mixed stream which is cooled by an absorber thereby to produce the working solution to be pumped by the pump.

BRIEF DESCRIPTION OF THE DRAWINGS

These, as well as other objects and advantages of this invention, will be more completely understood and appreciated by careful study of the following more detailed description of a presently preferred exemplary embodiments of the invention taken in conjunction with the accompanying drawings, in which.

DETAILED DESCRIPTION OF THE PRESENTLY PREFERRED EXEMPLARY EMBODIMENTS

Figure 1:
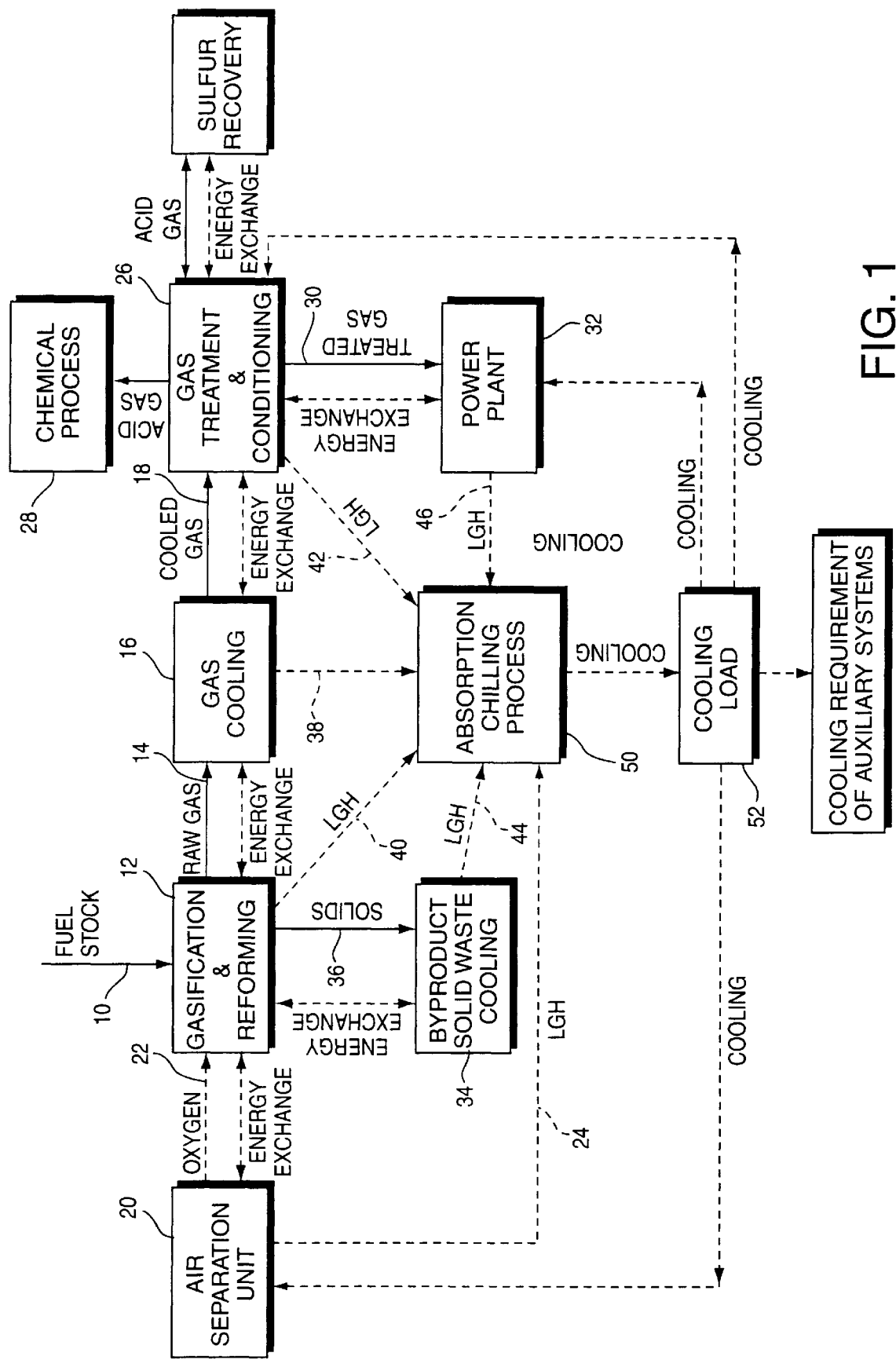
FIG. 1 is a schematic representation of the method and apparatus of the present invention.

Referring to FIG. 1, there is schematically depicted an integrated gasification system and method incorporating an absorption chilling cycle for using recoverable low grade heat to produce a cooling load for auxiliary cooling needs, to enhance the thermodynamic efficiency of the integrated gasification system. As is conventional, the gasification or gas reforming section 12 converts fuel stock 10 into a hot raw gas 14. The hot raw gas 14 is fed to the gas cooling section 16 which cools the hot gas to produce cooled gas 18 for further processing. Low grade heat 38 is a by-product of the gas cooling section 18 that, in accordance with an embodiment of the invention, is used for an absorption chilling process 50. Low grade heat 40 from the gasification and reforming section 12 may also be provided for the absorption chilling process 50.

As also shown in the schematic representation of FIG. 1, other, optional, subsystems of the integrated gasification system can also be integrated into the process, to enhance the performance of the system by providing additional sources of low grade heat for the absorption chilling process. For example, an air separation unit 20 may be included in the integrated gasification system. The air separation unit produces oxygen 22 for the gasification process 12 and has low grade heat 24 available in its air compression unit. This low grade heat 24 may be recovered for use in the absorption chilling process 50. Further, a gas treatment and conditioning section 26 may be provided to prepare the gas 30 for consumption in the power plant 32 or for chemical process 28 use, and a byproduct solid waste cooling section 36 may be provided, which receives solids 36 from gasification section 12. As illustrated, thermal energy can be exchanged between these various subsystems, and low grade heat 24, 38, 40, 42, 44, 46 from these subsystems can individually or collectively drive the absorption chilling system 50, to provide a cooling source to cool the auxiliary systems, thereby reducing auxiliary power demand. For example, the absorption chilling system can provide a cooling source for chilling the untreated gas before entering gas treatment and condition section 26 thereby allowing use of an acid gas removal process based on physical absorbents rather than on chemical absorbents. The physical absorbents require lower temperatures, usually refrigeration, which adds to the electric power demand, but require less steam and absorb less $CO_2$ from the untreated gas. More $CO_2$ is desirable in the treated gas because it gives more mass-flow into the gas turbine. With the absorptive chiller disclosed herein, the required chilling can be provided with a lot less power. Therefore by using the absorption chilling system to chill the untreated gas, the advantages of physical absorbents, e.g., less steam required and better $CO_2/H_2S$ selectivity, can be realized without paying the power penalty of adding a refrigeration cycle produced by mechanical means, such as a refrigerant compressor.

Figure 2:
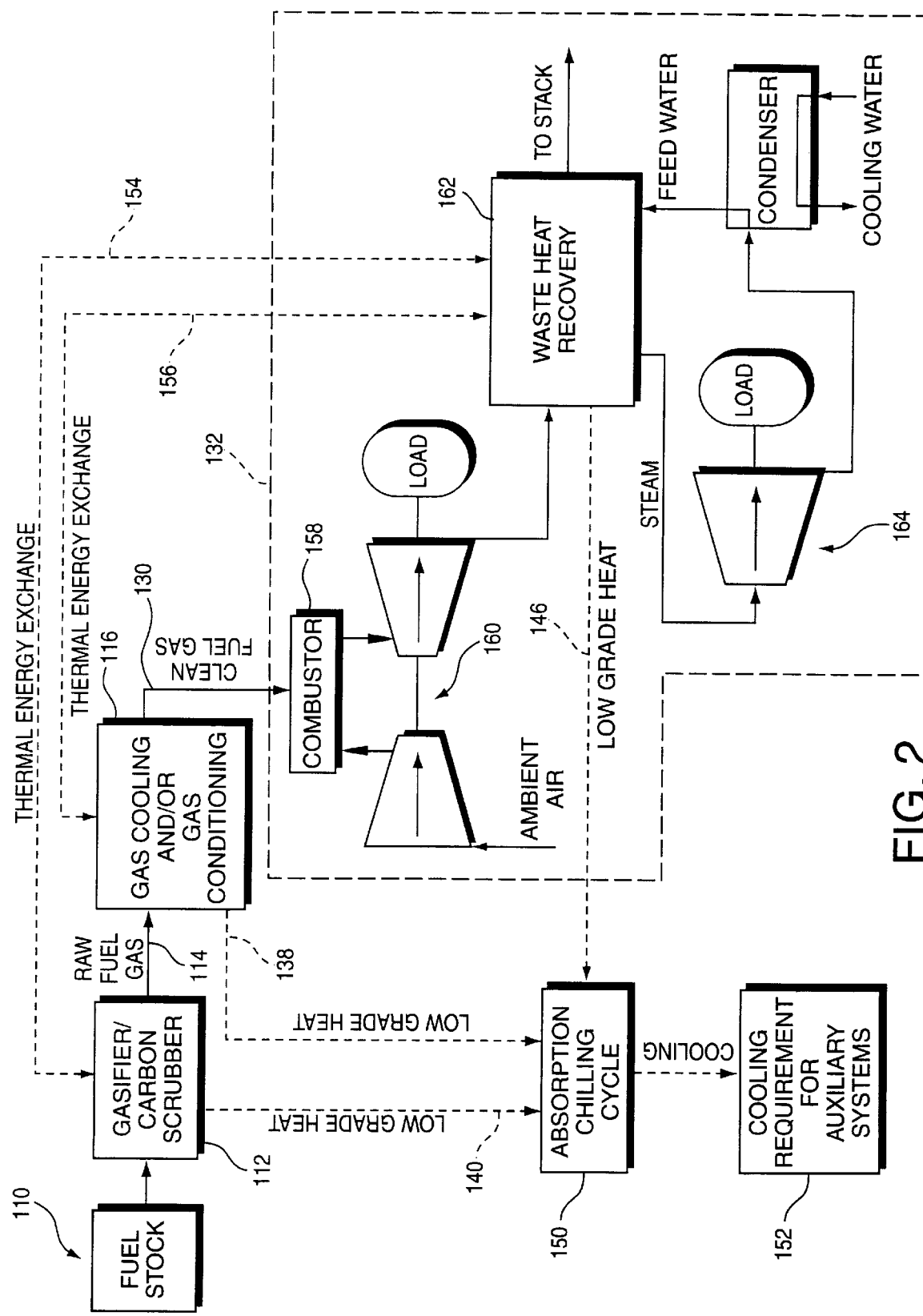
FIG. 2 is a schematic representation of an embodiment of the method and apparatus of the present invention.

An exemplary embodiment of the proposed recovery and conversion method of the present invention is an integrated gasification combined cycle (IGCC) system, as schematically depicted in FIG. 2. In this embodiment, the gasifier/carbon scrubber 112 converts the fuel stock 110 into raw fuel gas 114 which is fed to the gas cooling and/or gas conditioning section 116 which cools and cleans the raw fuel gas 114. As illustrated, thermal energy 154 is recovered from the gasifier scrubber 112 and/or thermal energy 156 is recovered from the gas cooling section 116 for enhancing the power output of the bottoming cycle. Moreover, low grade heat 138 from the fuel gas is available and, in accordance with the illustrated embodiment of the invention, is used for driving an absorption chilling cycle 150. Where low level heat 138 available from the gas cooling and/or gas conditioning section 116 is limited, additional heat can be obtained from other subsystems of the IGCC system. For example, an additional heat source for the absorption chilling cycle 150 can be the carbon scrubbing section 112 or the waste heat recovery section 162 when incorporated in the IGCC system, as shown by low grade heat supply 140 and 146, respectively.

In a conventional manner, the clean fuel gas 130 exiting the cooling and conditioning section is combusted in combustor 158 of the gas turbine 160 where the power is produced. The thermal energy of the exhaust gas of the gas turbine 160 is recovered by the water heat recovery section 162 for steam production. The steam produced is then used for driving the power producing steam turbine 164.

Figure 3:
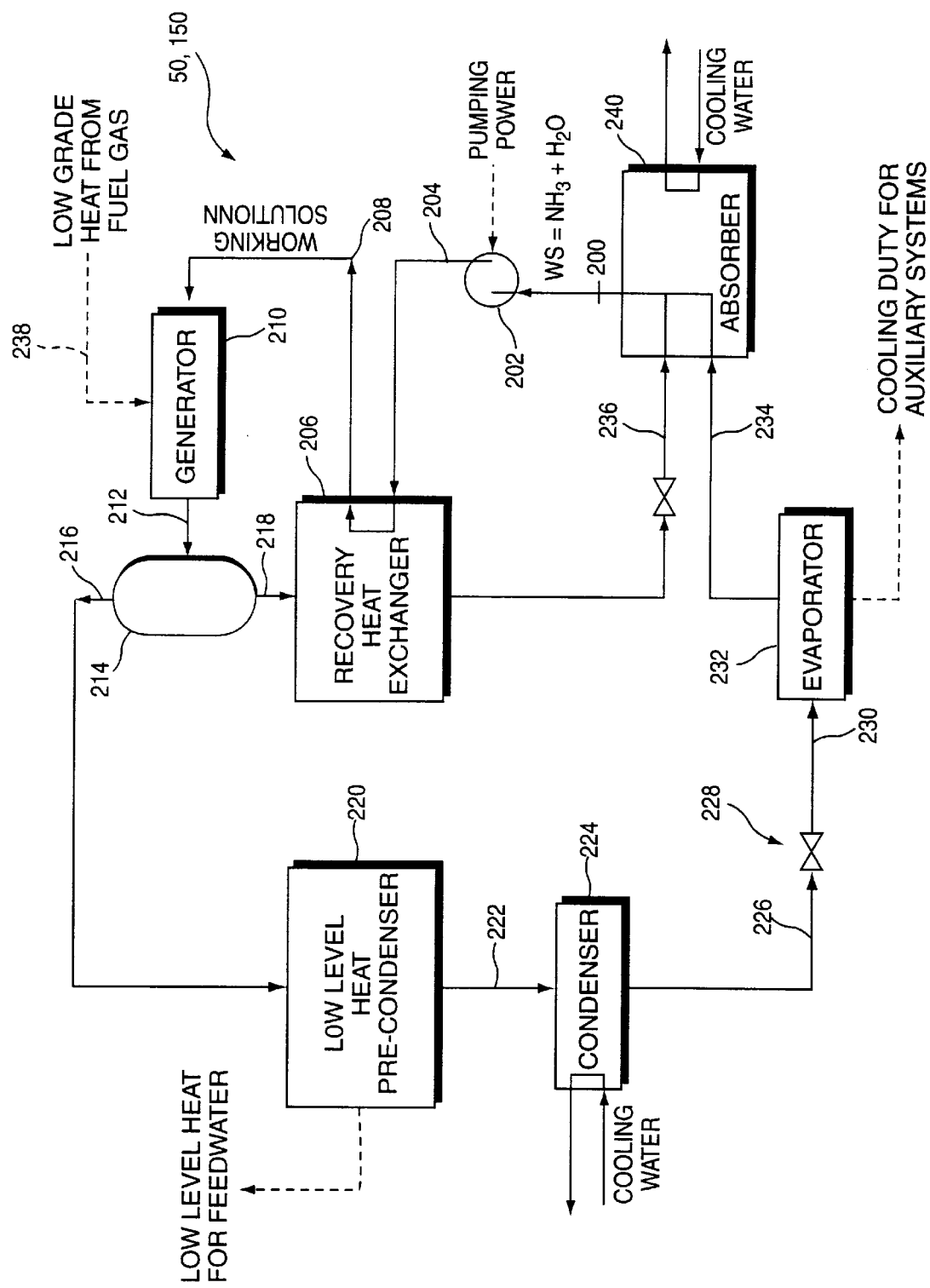
FIG. 3 is a schematic representation of an absorption chilling system embodying the present invention.

An exemplary, presently preferred embodiment of the absorption refrigeration cycle 50, 150 for implemented a thermodynamic cycle, using low grade heat recovered, for example by heat exchange, from the integrated gasification system is schematically depicted in FIG. 3. A two-component working fluid is employed in the illustrated apparatus. For an absorption refrigeration cycle, ammonia and water are typically used for the refrigerant and absorbent, respectively. However, other multi-component fluids are known in the art and can be used.

Referring more particularly to FIG. 3, the present invention is embodied an apparatus in which the two-component working solution at point 200 is pumped by a circulation pump 202 through a recovery heat exchanger 206 where it is heated in counterflow by lean stream 218 (see below). Additional heating is then provided by the low grade heat 238, which is recovered from the gas cooling 16, 116, and/or other subsystems of, e.g., the integrated gasification system, as discussed above. This additional heating drives the ammonia vapor, in this embodiment, from the working fluid. The two phase mixture 212 is sent into separator 214 so that the mixture is separated into a strong solution or rich stream 216 (enriched with the lower boiling point component when compared to the liquid working solution) and a weak solution or lean stream 218. The ammonia rich stream 216 of saturated vapor is then sent, optionally, into a low level heat pre-condenser heat exchanger 220 where it is cooled and heat may be recovered for use as low level heat for the bottoming cycle.

The ammonia rich vapor 222 thereafter is input to condenser 224 where it is condensed by cooling water. The resulting liquid ammonia 226 is then throttled by expansion valve 228, resulting in a temperature drop required for chilling. The ammonia refrigerant is then conducted to and evaporated in evaporator 232, thereby producing a cooling load. The cooling load so produced is made available for auxiliary plant systems that have cooling requirements, as shown by way of example, with phantom lines in FIG. 1. Finally, the returning ammonia rich vapor 234 is mixed with the lean stream 236 output from heat exchanger 206 and cooled in absorber 240 by cooling water, thereby returning to the working solution to a state suitable for the cycle to be repeated.

As is apparent from the foregoing, with the proposed absorption system, the only power required for operating the absorption cycle is the pumping power for driving the working solution. The pumping required for this absorption cycle, however, is significantly less than the power required for, for example, a mechanical chilling system providing the same cooling duty. The resulting power savings enhances the net power and efficiency of the power plant. Moreover, the equipment cost for the absorption chiller may be less than the cost of a mechanical chiller.

The following are examples of integrated gasification plants in which an absorption chilling system as described herein above may be integrated:

Boiler Turbine Generator
Integrated Gasification Gas Turbine System
Integrated Gasification Combined Cycle System
Gas Making Plants The following are examples of opportunities where cooling from the absorption chilling cycle described herein above can be applied:

Cooling needs of the Air Separation Unit
Gas turbine inlet chilling
Cooling requirements below temperatures attained by cooling water for gas treatment unit (Acid Gas Removal) for removal of sulfur and to minimize removal of other components such as useful hydrocarbons and CO2 contained in the raw gas and conditioning of gas entering gas treatment unit compared to removal of acid gases at higher temperatures
Other processes requiring cooling While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of producing a cooling load, comprising the steps of:

pumping a liquid working solution along a flow path;
   heating said working solution;
   forming from the working solution a rich stream and a lean stream;
   condensing the rich stream to produce a liquid rich stream;
   throttling the liquid rich stream to reduce a temperature thereof;
   evaporating the rich stream to produce a cooling load;
   mixing the rich vapor stream produced by said evaporating step with the lean stream to produce a mixed stream; and
   cooling said mixed stream in an absorber thereby to produce the working solution.

2. The method of claim 1, wherein said heating step comprises heating the working solution with heat recovered from a remote heat source having a temperature less than about 150° C.

3. The method of claim 2, wherein said heating step comprises heating the working solution with heat recovered from an integrated gasification system.

4. The method of claim 3, wherein the heat source is selected from the group consisting of a gas cooling system, a gasification and reforming system, an air separation unit, a gas treatment and conditioning system, a waste heat recovery system, and a byproduct solid waste cooling system.

5. The method of claim 1, further including the step of pre-heating the liquid working solution with heat transferred from the lean stream, before said heating step.

6. The method of claim 1, further including the step of pre-condensing said rich stream before said condensing step, to cool the same.

7. An apparatus for producing a cooling load, comprising:
   a first flow path;
   a pump for pumping a liquid working solution along said first flow path;
   means for heating said working solution flowing along said first flow path with heat from a source remote from said first flow path;
   a separator for forming a rich stream and a lean stream from heated working solution flowing thereinto from said first flow path;
   a second flow path for the rich stream exiting the separator;
   a third flow path for the lean stream exiting the separator;
   a condenser along the second flow path for condensing the rich stream to produce a liquid rich stream;
   a throttle valve along the second flow path for reducing a temperature of the liquid rich stream;
   an evaporator along the second flow path for evaporating the rich stream to produce a cooling load;
   said second flow path and said third flow paths joining to define a first end of said first flow path, downstream from said evaporator, for mixing the rich vapor stream produced by said evaporator with the lean stream flowing along the third flow path, to produce a mixed stream; and
   an absorber for cooling said mixed stream thereby to produce the working solution to be pumped by said pump.

8. The apparatus of claim 7, wherein said means for heating comprises means for heating the working solution with heat recovered from a remote heat source having a temperature less than about 150° C.

9. The apparatus of claim 7, wherein said means for heating comprises means for heating the working solution with heat recovered from a low grade heat source in an integrated gasification system.

10. The apparatus of claim 9, wherein the heat source is selected from the group consisting of a gas cooling system, a gasification and reforming system, an air separation unit, a gas treatment and conditioning system, a waste heat recovery system, and a byproduct solid waste cooling system.

11. The apparatus of claim 7, further including a heat exchanger for pre-heating the liquid working solution with heat transferred from the lean stream.

12. The apparatus of claim 7, further including a pre-condenser heat exchanger for pre-condensing said rich stream upstream of the condenser, to cool the same.

13. An integrated gasification system comprising:
   a gasification and reforming system for receiving a fuel stock and converting the same to a hot raw gas, a gas cooling section for cooling the hot raw gas produced by the gas reforming section and an absorption chilling system for recovering low grade heat from at least the gas cooling system and producing a cooling load for auxiliary cooling, said absorption chilling system including:
   a first flow path;
   a pump for pumping a liquid working solution along said first flow path;
   means for heating said working solution flowing along said first flow path with low grade heat from at least the gas cooling system;
   a separator for forming a rich stream and a lean stream from heated working solution flowing thereinto from said first flow path;

a second flow path for the rich stream exiting the separator;

a third flow path for the lean stream exiting the separator;

a condenser along the second flow path for condensing the rich stream to produce a liquid rich stream;

a throttle valve along the second flow path for reducing a temperature of the liquid rich stream;

an evaporator along the second flow path for evaporating the rich stream 30 to produce a cooling load;

said second flow path and said third flow path joining to define a first end of said first flow path downstream from said evaporator for mixing a rich vapor stream produced by said evaporator with the lean stream flowing along the third flow path to produce a mixed stream; and an absorber for cooling said mixed stream thereby to produce the working solution to be pumped by said pump.

14. The integrated gasification system of claim 13, further comprising at least one of an air separation unit, a gas treatment and conditioning system, a waste heat recovery system, and a byproduct solid waste cooling system and wherein the heat low grade heat is from the gas cooling system and from at least one of the gasification and reforming system, the air separation unit, the gas treatment and conditioning system, the waste heat recovery system, and the byproduct solid waste cooling system.

15. The integrated gasification system of claim 13, wherein the absorption chilling system further includes a heat exchanger for pre-heating the liquid working solution with heat transferred from the lean stream.

16. The integrated gasification system of claim 13, wherein the absorption chilling system further includes a pre-condenser heat exchanger for pre-condensing said rich stream upstream of the condenser, to cool the same.

* * * * *